United States Patent
Kancharla et al.

(10) Patent No.: US 11,714,812 B2
(45) Date of Patent: Aug. 1, 2023

(54) SYSTEM FOR AUGMENTING AND JOINING MULTI-CADENCE DATASETS

(71) Applicant: Capital One Services, LLC, McLean, VA (US)

(72) Inventors: Gopi Kancharla, Frisco, TX (US); Praveen Tandra, Allen, TX (US); Parvesh Kumar, Plano, TX (US); Suresh Sammeta, Frisco, TX (US); Zainil Momin, Carrollton, TX (US); Srinivas Mupparapu, Plano, TX (US); Dustin Doubet, Sanger, TX (US)

(73) Assignee: Capital One Services, LLC, McLean, VA (US)

( * ) Notice: Subject to any disclaimer, the term of this patent is extended or adjusted under 35 U.S.C. 154(b) by 134 days.

(21) Appl. No.: 17/315,624

(22) Filed: May 10, 2021

(65) Prior Publication Data

US 2022/0358123 A1    Nov. 10, 2022

(51) Int. Cl.
*G06F 16/2455* (2019.01)
*G06F 16/23* (2019.01)

(52) U.S. Cl.
CPC ...... *G06F 16/2456* (2019.01); *G06F 16/2379* (2019.01)

(58) Field of Classification Search
None
See application file for complete search history.

(56) References Cited

U.S. PATENT DOCUMENTS

| | | | |
|---|---|---|---|
| 2014/0289188 A1* | 9/2014 | Shimanovsky | G06F 16/2386 707/609 |
| 2016/0300157 A1* | 10/2016 | Sankaradas | G06F 16/252 |
| 2018/0322170 A1* | 11/2018 | Alberton | G06F 16/24568 |
| 2021/0232592 A1* | 7/2021 | Liao | G06F 16/258 |
| 2022/0012258 A1* | 1/2022 | Kumar | G06F 16/24568 |
| 2022/0044144 A1* | 2/2022 | Wisniewski | G06N 20/20 |

* cited by examiner

*Primary Examiner* — Richard L Bowen
(74) *Attorney, Agent, or Firm* — Banner & Witcoff, Ltd.

(57) ABSTRACT

A computing system may comprise a server system, a database, and one or more data sources having different cadences, such as a batch data source and a real-time data source. The server system may generate a first dataset based on data from the batch data source, and may generate a second dataset based on data received from the real-time data source. The server system may determine metadata associated with the real-time data source. Based on the metadata, the server system may generate a database table representation of the real-time data source. The server system may be configured to perform a relational join on the first and second datasets. Such a relational join may define a namespace that is based on the first and second datasets.

20 Claims, 7 Drawing Sheets

Namespace Creation
380

382 — Name: LeadReminder

Namespace Description: Provides unified data attributes needed for initiating the lead reminders — 384

Primary Dataset: lead_information — 386

Select attributes from lead_information: lead_identifier, full_name, contact_address — 388

Select key column from Primary Dataset: ☑ lead_identifier — 390

- - - - - - - - - - - - - - - - - - - - - - - - -

392 — Join With: lead_status   394 — Using Join Type: LEFT

ON lead_information.lead_identifier = lead_status. lead_identifier — 396

Select attributes from lead_status data source:

match_score, reminder_eligible — 397

Namespace Preview

```
Select
   lead_information.lead_identifier,
   lead_information.full_name,
   lead_information.contact_address,
   lead_status.match_score,
   lead_status.reminder_eiligible
From
   lead_information
   left join lead_status on lead_information.lead_identifier=lead_status.lead_identifier
Where
   lead_information.lead_identifier = ?
```
— 398

FIG. 3D

SYSTEM FOR AUGMENTING AND JOINING MULTI-CADENCE DATASETS

TECHNICAL FIELD

The present disclosure is generally related to joining and/or augmenting datasets.

BACKGROUND

Computer systems may receive, transform, and/or output data from various types of data sources, such as databases. A computing device may request data from such data sources. For instance, such a computing device may submit a database query that may cause data indicated by the query to be returned from the database. In some instances, a computing device may transform data received from such data sources. For instance, the computing device may perform various operations by executing a query. For example, such operations may join data from different database tables and/or limit data that should be returned by such a database query.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding methods, apparatus, systems, and computer-readable media are also within the scope of the disclosure.

Systems described herein provide a computing system that may be configured to receive and/or join data from multiple data sources having differing cadences. A data source may be any entity that stores or holds data directly or indirectly. Some examples of such data sources may comprise databases, file-based storage, block-based storage, object storage (e.g., on Amazon S3), streams, such as Apache Kafka streams, and/or on-demand data sources, such as APIs. A "cadence" may be a frequency at which such data sources may be updated and/or provide data.

Such data sources may be classified into different types based on their associated cadences. One such type of data source is a batch data source, which may provide data as a single batch. Examples of batch data sources may comprise databases, data warehouses, block-based storage, file-based storage, various forms of object-based storage, and/or batch jobs, as some examples. Another type of data source may be a real-time data source. Such real-time data sources may include streams, and/or publication/subscribe (pub/sub) data sources that may provide data on a continuous or ongoing basis. Yet another type of data source may be an on-demand data source. Examples of such on-demand data sources may comprise APIs that return data in response to a request to that API, and/or any data that may be served by an API.

Existing systems typically do not allow the combination of data sources that have different cadences. For example, existing techniques do not allow data obtained from a batch data source, such as a database, to be combined with data from a real-time data source, such as a Kafka stream. However, combining data from such data sources having differing cadences is frequently necessary and/or useful. For example, it may be desirable to use data obtained from an API to augment stream data from a real-time, streaming data source in order to create a larger single surface area of data.

The techniques of this disclosure provide a computing system that may be configured to automatically combine data from different data sources having one or more cadences, such as real-time, batch or on-demand. Such techniques may further provide an application that may be configured to allow users to view data sources for combination. Based on an indication of two or more sources for combination, such an application may automatically combine the two sources and resolve any differences in their cadences. Such an application may also be configured to optionally augment data sources with data from an API, which may allow data from a data source to be enriched by the API before it is combined with data from another data source. And, such an application may allow a user to specify the manner in which data sources are to be joined, for instance by executing relational joins on data from the data sources. By allowing the automatic combination of data sources having different cadences, the techniques of this disclosure may allow users to quickly combine such data sources without having to resort to writing code. Accordingly, the techniques of this disclosure may reduce the barrier to entry for combining data from data sources having different cadences by eliminating the need for code. Further, the techniques of this disclosure may allow combinations of data from data sources that were previously infeasible or unable to be combined.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIG. 3D shows an example user interface for creating a namespace in accordance with one or more aspects described herein;

DETAILED DESCRIPTION

Figure 1:
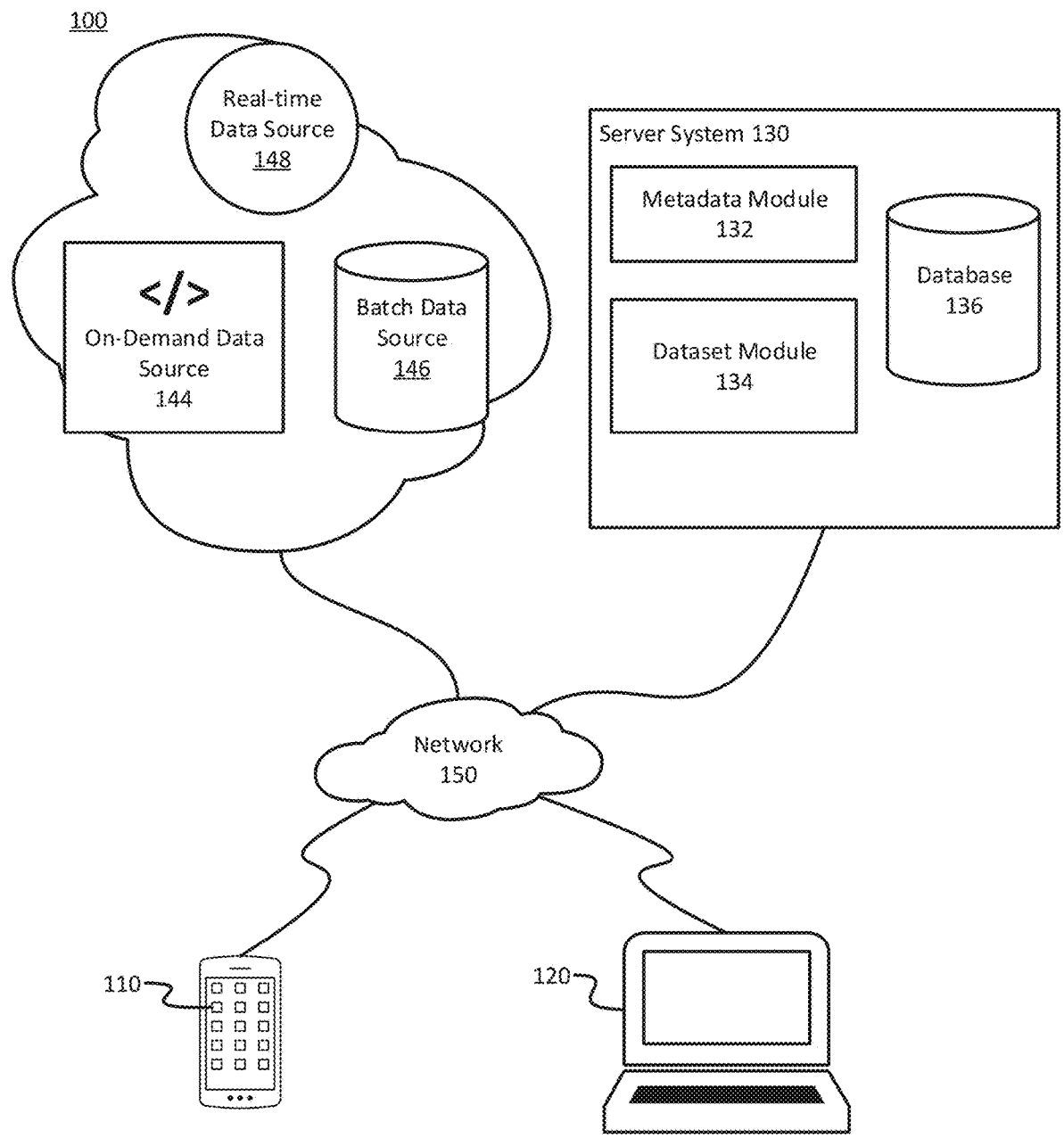
FIG. 1 shows an example of an operating environment in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques combining data from data sources having cadences. As described above, a data source may be an entity that may store or hold data directly or indirectly. One type data source is a batch data source, which may provide data in one or more batches. Examples of batch data sources may comprise databases, data warehouses, block-based storage, file-based storage, object-based storage, and/or batch jobs, as some examples. Real-time data sources are another such type of data source. Real-time data sources may comprise streams, and/or pub/sub data sources may provide data on a continuous or ongoing basis. On-demand data sources may comprise yet another such type of data source. An example of an on-demand data source may comprise an API that returns data and/or performs a function in response to a request to that API.

Different types of data sources, such as those described above, may have different cadences. Such cadences may indicate a frequency at which a data source, and consequently data provided by a data source, may be updated. Data sources having different cadences may not be readily combinable due to such differing cadences. Nevertheless, there is a need to be able to combine such data sources having different cadences. For instance, data needed for marketing purposes may not be available from a single data source, but rather may be spread across multiple different data sources, each of which may have a different cadence. Yet, there is frequently a need to combine data from such data sources having differing cadences.

The techniques of this disclosure address the aforementioned problems associated with combining data from data sources having different cadences. The techniques of this disclosure may configure a computing device to execute an application that provides an interface, such as a graphical user interface (GUI) that may receive user inputs. Based on those received inputs, the computing device may be configured to combine data from two or more data sources, which may have differing cadences. Such an application may provide the additional advantage of allowing a user to combine data from two or more data sources without requiring that user to write any code. Still further, such an application may provide the additional advantage of converting data from different data sources into a standardized format.

To allow combining of such data sources, a computing system configured in accordance with this disclosure may be configured to identify a plurality of data sources. Such an application may be configured to present the identified data sources to a user for selection via a GUI, as one possible example. The application may receive one or more user inputs indicating a first data source for selection. Based on the user's selection of a first data source, the application may be configured to display elements associated with the selected data source. Such elements may comprise attributes and/or metadata associated with the data source. Examples of such attributes may comprise columns of one or more data sources, as one possible example.

In the case that such a first data source comprises a batch data source such as a database, a computing device may determine database columns by querying the database (e.g., via a structured query language (SQL) query). However, real-time data sources, such as streams, may not have such a standardized column-based structure as a database generally does. Accordingly, such an application may be configured to determine metadata for such data sources that do not have columns by default. In the case of streams and/or other real-time data sources, such an application may be configured to cause a database (e.g., an in-memory database, such as MemSQL/SingleStore) to ingest a snapshot of data from the real-time data source. Such a dataset may comprise data from a data source that has been ingested by, and/or stored in such a database. Based on metadata for the real-time data source and the ingested snapshot, the application may be configured to determine one or more columns of the real-time data source. Such a first dataset selected may be referred to herein as a primary dataset.

The application may also receive an indication of a selection of one or more columns of the selected data source. Such selected columns may be indicated programmatically and/or based on user input. The selected columns may form the basis for a dataset of the selected data source. The application may be further configured to receive a selection of a key column for the dataset. Such a key column may comprise one of the columns that the user has selected from the first data source, as one example. Such a key column may be used to join (e.g., collate) data from columns of the first data source with data from at least one other data source to form a namespace, as described in greater detail below.

Such an application may also be configured to augment data from a data source with data from an on-demand data source, such as data from an API. The application may be configured to determine one or more on-demand API data sources, such as APIs. Elements of such APIs, such as function calls, variables, etc., may be output for display via an interface of the application. A user may select one or more functions, pieces of data, etc. with which to augment data from the first data source. Based on the selected elements of the on-demand data source, the application may augment the data from the first data source in the manner indicated by the user. For example, certain elements of the first data source may be transformed by executing a function on the data of the first data source. In some examples, data from such an on-demand data source may be converted to a column-based format, and data from another data source may be augmented with the column-based on-demand data.

The application (e.g., the application executing on a computing device) may be further configured to receive an indication of a second data source. Based on the indicated second data source, the application may determine one or more attributes of the second data source. Such attributes may take the form of one or more columns to use as a basis for a second dataset, according to some examples. The application may be further configured to receive indications of a key column of the second dataset. Such a key column may be one of the columns selected for inclusion in the second dataset.

Based on the key columns of the first and second datasets, the computing device may be configured to join the first and second datasets to form a namespace. Such a namespace may comprise a logical view that may contain attributes from one or more datasets (two datasets in this example). Such joining may comprise a relational join (e.g., a join based on relational algebra) that may be based on the key columns according to some examples. By joining data sets in accordance with the techniques described herein, the overall surface area of datasets may be increased, which may allow for the creation of a single dataset that comprise data from multiple datasets having different cadences.

Additionally, once set up, the data for such namespaces may be saved and/or updated based on the cadences of the member datasets. For instance, data for such a namespace may be periodically updated based on a cadence of a real-time data source, as one possible example.

Operating Environments and Computing Devices

FIG. 1 shows an operating environment 100. The operating environment 100 may include at least user client device 110, user client device 120, server system 130, one or more on-demand data source 144, batch data source 146, and/or real-time data source 148 in communication via network 150. It will be appreciated that the network connections shown in relation to network 150 are illustrative and any means of establishing a communications link between the computers may be used. The existence of any of various network protocols such as TCP/IP, Ethernet, FTP, HTTP and the like, and of various wireless communication technologies such as Bluetooth, GSM, CDMA, 3GPP protocols, WiFi, LTE, and/or 5G, is presumed, and the various computing devices described herein may be configured to communicate using any of these network protocols or technologies. Any of the devices and systems described herein may be implemented, in whole or in part, using one or more computing systems described with respect to FIG. 2.

Client devices 110, 120 may provide data to, request data from, and/or interact with server system 130. Examples of client devices 110 and 120 may comprise computing devices, such as smartphones, tablets, laptops, wearable devices, or various other forms of computing devices as well. Access to server system 130 and/or resources thereof may be restricted to certain ones of client devices 110, such as client devices that provide certain credentials for authenticating users of those client devices. Client devices 110, 120 may be devices that are associated with server system 130.

Server system 130 may comprise one or more computing devices, such as servers, which may include processors and/or memory and that may be configured to execute a variety of different applications and/or components. At a high level, server system 130 may be configured to execute one or more applications and/or modules that may be configured to combine data from two or more data sources.

Server system 130 may comprise components and/or associated applications such as metadata module 132, dataset module 134, and/or database 136. Metadata module 132 may identify one or more data sources, and/or determine metadata for data sources. For instance, metadata module 132 may be configured to determine metadata for data sources, such as on-demand data source 144, batch data source 146, and/or real-time data source 148, as some non-limiting examples. In some examples, such metadata may itself be stored in a data store, such as database 136. Metadata module 132 may be executed by server system 130, and/or on a client device, as some possible examples.

The metadata determined by metadata module 132 may take various forms. At a high level, such metadata may comprise a schema for a data source and/or descriptive information for attributes of a data source. For a relational data source, such as a database, such a schema may comprise database tables stored in a database. For a given table, such metadata may include column names, data types associated with each column, whether a column is a primary key, and/or a textual description of one or more columns. For a data source that does not include tables, such as a real-time data source, such metadata may indicate one or more columns, column names, data types for each column and/or descriptions of such columns, as some non-limiting examples.

At a high level, dataset module 134 may be configured to perform various operations on data sources and datasets. Examples of such operations may include joining datasets, and/or augmenting datasets, as some non-limiting examples. Such operations may take various other forms as well. According to some embodiments, dataset module 134 may generate a GUI that may be configured to receive user inputs that indicate one or more data sources, and/or operations to perform on the one or more data sources. Additionally or alternatively, dataset module 134 may comprise a programmatic interface that may interface with code (e.g., source code written in a programming language). Such a programmatic interface may allow programmatic control over data source selection, augmentation, joining, and/or other operations that may be performed on data sources.

As will be shown in greater detail below in connection with FIG. 3, dataset module 134 may be configured to output, for display, one or more data sources via a GUI. Such data sources may be selectable via the GUI. Based on receiving a selection of a data source and determination of metadata associated with the data source, dataset module 134 may display one or more columns that may be determined based on the data source. Dataset module 134 may also receive a selection of one or more columns from the data source. Based on such a selection of one or more columns, dataset module 134 may create a dataset. In some examples, creating such a dataset may comprise ingesting data from the selected columns into a database, such as database 136. Ingesting such columns may result in the selected columns being represented as standardized format, such as a table of database 136. Dataset module 134 may be configured to receive selections of one or more additional data sources, and columns thereof. Based on the selected columns, dataset 134 may create additional datasets, which may be stored in database 136.

Dataset module 134 may also be configured to join data from two or more datasets together. The joining of such datasets may define a namespace. Such a namespace may be in a standardized format, such as a standardized row and column format, etc. Dataset module 134 (e.g., dataset module 134 executing on server system 130) may join such datasets based on an indicated key column from each dataset. Dataset module 134 may join such datasets by performing a relational join (e.g., a relational algebraic join), and/or various other operations on such datasets. In some examples, performing such joins may involve generating a query, such as a SQL query, that indicates operation(s) to be performed, and when executed, may cause database 136 to execute such a query.

Dataset module 134 may also be configured to augment a dataset with data from another data source, such as an on-demand data source (e.g., on-demand data source 144). Augmenting a dataset may take various forms. As one example, dataset module 134 may apply a function, which may transform data of a dataset, such as a primary dataset. Such an augmented dataset may be joined with another dataset to form a namespace based on the augmented dataset and the other dataset.

Server system 130 may execute database 136, which may be an in-memory database that may offer faster database reads and writes as compared to databases that are not in-memory. Examples of such databases may include, but are not limited to, relational databases, hierarchical databases, distributed databases, in-memory databases, flat file databases, XML databases, NoSQL databases, graph databases, and/or combinations thereof. Dataset module 134 and/or metadata module 132 may store data in database 136. For example, one or more datasets, database tables, namespaces, and/or metadata may be stored in database 136.

According to some examples, database 136 may comprise a high-performance in-memory database, such as MemSQL/SingleStore. Such a high-performance database may be configured to rapidly ingest real-time data from a real-time data source, such as real-time data source 148. Ingesting real-time data may include storing a snapshot of data from the real-time data source in memory, determining a schema for such real-time data, and/or generating a dataset representation of the data. Such a dataset may comprise one or more rows and columns, which server system 130 may determine based on metadata associated with the data source.

Server system 130 and/or client devices 110, 120 may be configured to identify, ingest data from, and/or join data from one or more data sources. Such data sources may include, but may not be limited to: one or more real-time data source 148, one or more on-demand data source 144, and/or one or more batch data source 146. Examples of real-time data source 148 may include data streams, such as Apache Kafka streams. According to some examples, such streams may generate data in a JavaScript Object Notation (JSON) format.

Examples of batch data source 146 may include databases, data warehouses, block-based data sources, and/or object-based data sources, as just some examples. Examples of such block-based data sources may include Server Message Block (SMB) and/or network file system (NFS) file sources, as some non-limiting examples. Examples of such object-based data sources may include Amazon S3 buckets, Google Cloud storage, Azure Storage, object-based file systems. Batch data source 146 may take various other forms as well.

On-demand data source 144 may comprise a data source that provides data upon request. An example of one such on-demand data source may be an API. Such an API may provide one or more functions, data structures, and/or other data upon request, for instance upon request from server system 130. According to some examples, such an API may be behind an API gateway, which may provide a registry for one or more APIs. Additionally or alternatively, an API gateway may provide authentication and/or authorization for one or more APIs.

Data sources 144, 146, and 148 are illustrated as being cloud-based in FIG. 1 for the purpose of example. Such cloud-based data sources may be hosted by a single provider or multiple different providers. It should be understood that such data sources may be cloud-based data sources, distributed data sources, on-premises (e.g., local) data sources, and/or data sources that may be hosted in various other manners as well.

Various computing devices are described as performing functions described in the context of operating environment 100. However, it should be noted that any computing device or combination of computing devices in the operating environment 100 may perform any of the processes and/or store any data as described herein.

The data transferred to and from various computing devices in operating environment 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in data transfers to protect the integrity of the data such as, but not limited to, Secure File Transfer Protocol (SFTP), and/or Pretty Good Privacy (PGP) encryption. In many embodiments, one or more web services may be implemented within the various computing devices of operating environment 100. Web services may be accessed by authorized external devices and users to support input, extraction, and manipulation of data between the various computing devices in the operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment 100 in front of one or more computing devices such that any external devices may communicate directly with the specialized hardware.

Figure 2:
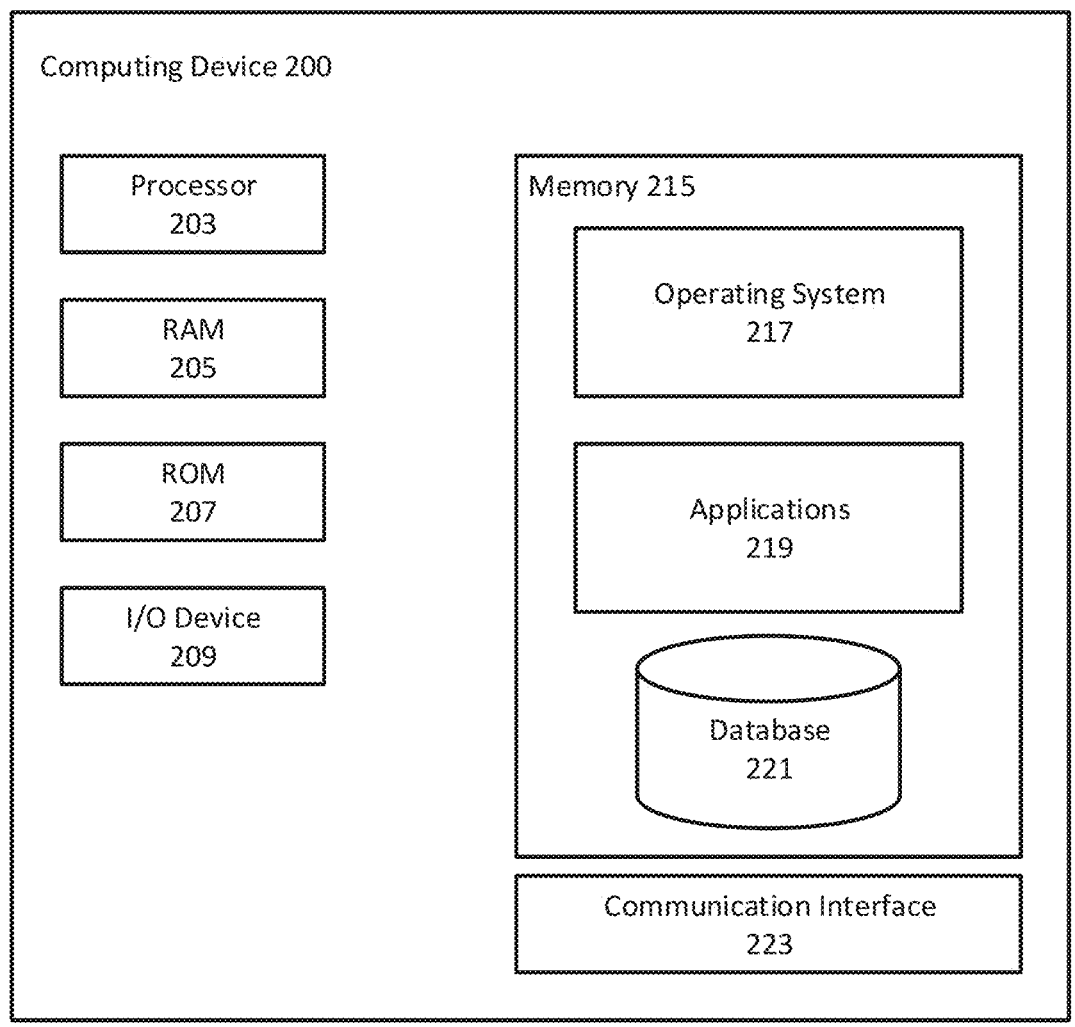
FIG. 2 shows an example computing device in accordance with one or more aspects described herein.

Turning now to FIG. 2, a conceptual illustration of a computing device 200 that may be used to perform any of the techniques as described herein is shown. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, LTE, and 5G is presumed, and the various computing devices described herein may be configured to communicate using any of these network protocols or technologies.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Dataset Combinations

Figure 3B:
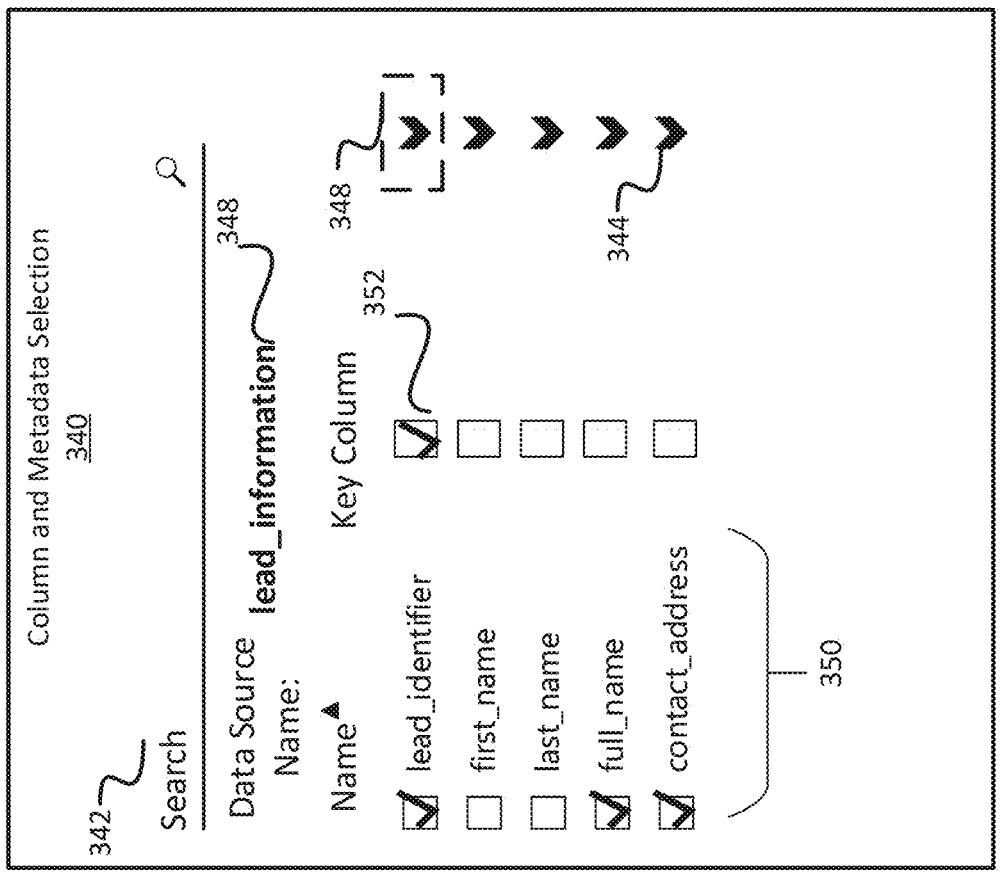
FIG. 3B shows an example user interface for selecting attributes of a data source in accordance with one or more aspects described herein.
Figure 3A:
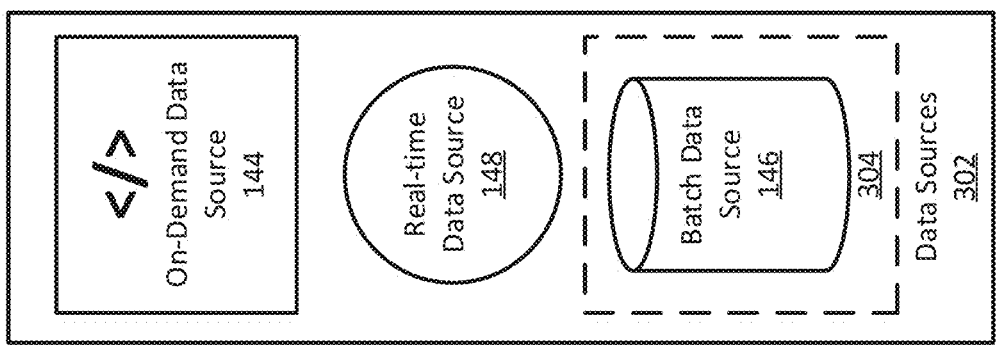
FIG. 3A shows an example user interface for selecting one or more data sources in accordance with one or more aspects described herein.

As explained above, a computing device may be configured to execute an application that generates a GUI for performing various operations on one or more data sources. FIG. 3A shows an example GUI that may be configured to perform such operations. The GUI of FIG. 3A may display a list of one or more data sources 302, such as on-demand data source 144, real-time data source 148, and batch data source 146 in this example. Such data sources may be determined by dataset module 134 based on, for example, a database of such data sources. Though three data sources are shown in the example of FIG. 3A, it should be understood that more or fewer data sources may be included in the list of data sources 302 as well.

A computing device may receive a user input that indicates a selection of one of data sources 302 to use as a primary data source. Such a primary data source may be selected as a basis to generate a dataset. In the example of FIG. 3A, a user may have selected batch data source 146 as a primary data source. This selection is indicated with dashed box 304 for the purpose of example. While data sources 302 are illustrated as a set of graphical icons, it should be understood that such data sources may be represented and/or selected in various other manners as well.

According to some examples (not pictured), a specific data source type (e.g., S3, Snowflake, etc.) may be selectable from a dropdown user interface element. A selection of such a provider may populate data sources of the selected type in a second dropdown user interface element. The second dropdown may be populated with names of the specific data sources having the selected type. Additionally or alternatively, such data sources may be searchable, for instance based on data source name, line of business, and/or other attributes.

Based on a selection of a data source, dataset module 134 (e.g., dataset module 134 executing on server system 130) may generate a user interface, such as column and metadata selection dialog 340. Dialog 340 may be configured to receive one or more indications of columns (350) to include in a dataset that may be based on an indicated data source. Dialog 340 of FIG. 3B may comprise names of one or more columns from a selected dataset. In the example of FIG. 3B, columns 350 of batch data source 146 may comprise columns named "lead_identifier," "first_name," "last_name," "full_name," and "contact_address." All of these columns are indicated as being from the data source named "lead_information," as indicated by user interface element 348. In order to allow faster identification of a column, such columns may be searchable via search dialog 342. Of columns 350, dataset module 134 may have received indications (indicated by check marks) that "lead_identifier," "contact_address," and "full_name" have been selected for inclusion in a dataset.

Each column name may be selectable. For instance, in the example of FIG. 3B, there may be a checkbox next to each column name of columns 350. If dataset module 134 receives a selection of such a column name, that selected column may be selected for inclusion in a dataset. Dataset module 134 may also receive an indication that a column is indicated as a key column by checking a box (e.g., checkbox 352) corresponding to that column. Dataset module 134 may use a key column as a basis for joining that column with a key column of another dataset. In the example of FIG. 3B, dataset module 134 may have received an indication that the column titled "lead_identifier" has been indicated as a key column based on checkbox 352 being checked.

Dialog 340 may also include a user interface control in corresponding to each column that, if selected, may provide further details regarding the selected column. In the example of FIG. 3B, such a user interface control may be indicated by downward-pointing chevrons, such as chevron 344. It should be understood, however, that such a user interface control may take various other forms as well. For instance, selecting a column name may cause such details to be displayed (e.g., without selecting another corresponding user interface element). In this example, the chevron user interface control for "lead_identifier" may be selected, as indicated by box 348 having a dashed outline for the purposes of this example.

Figure 3C:
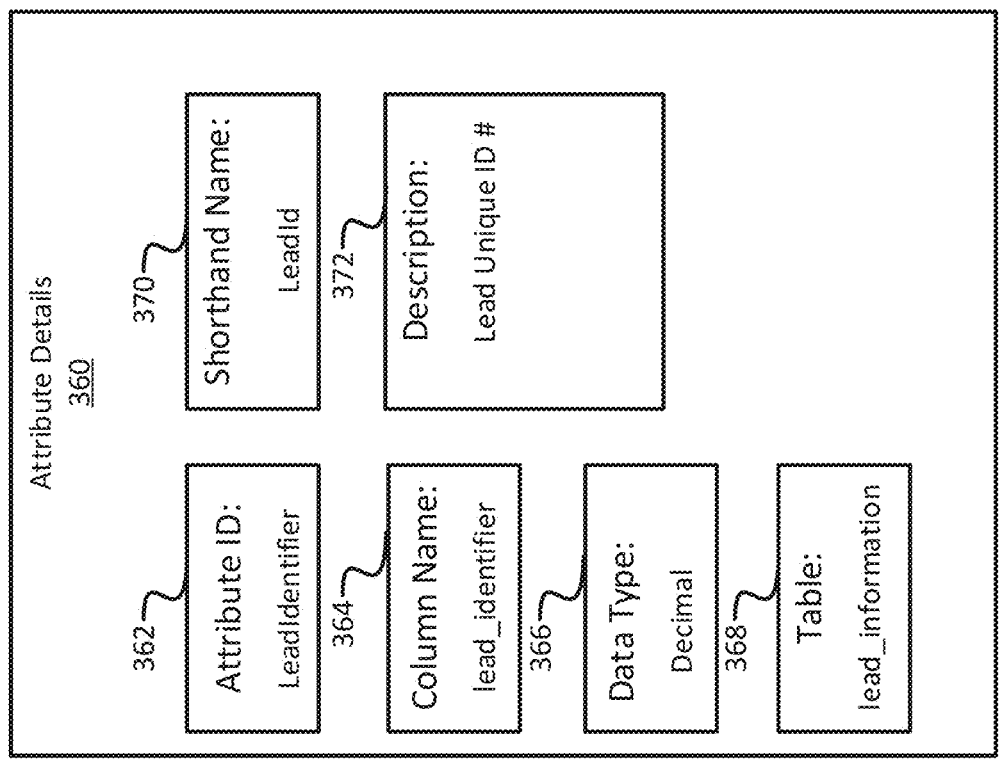
FIG. 3C shows an example user interface for outputting attribute details of a data source in accordance with one or more aspects described herein.

Turning now to FIG. 3C, attribute details dialog 360 may be output for display based on a dataset module 134 receiving a user input indicating a request for details of a given attribute. For instance, server system 130 may generate dialog 360 based on receiving an input from dialog 340 of FIG. 3B selecting the chevron surrounded by dashed box 348. Attribute details 360 may be generated, and/or output for display based on various other factors as well. Attribute details dialog 360 may be displayed as a window or may be integrated with other windows and/or dialogs, such as dialog 340 of FIG. 3B.

In the example of FIG. 3C, attribute details 360 may comprise various attributes, such as an attribute identifier (ID) 362, column name 364, data type 366, table 368, shorthand name 370, and/or description 372. Attribute details dialog 360 may include more or fewer attribute details as well.

Attribute ID 362 may indicate an identifier of an attribute. Column name 364 may indicate a name of a column within a data source to which the attribute belongs. Data type 366 may indicate a data type of the attribute. Examples of such data types may include types such as: long, short, string, set, Binary Large OBject (BLOB), char (e.g., a fixed length string), varchar (e.g., a variable length string), Boolean, integer, double, etc. Such data types may take various other forms as well. In the example of FIG. 3C, the attribute has a "decimal" data type as indicated by data type 366. Table 368 may indicate a table to which the attribute belongs. Shorthand name 370 may indicate an alias or alternative shorthand name that may be used to refer to the attribute. Description 372 may comprise a textual description of an attribute. Such a description may be generated by dataset module 134 and/or may be set based on a received user input. Attribute details, such as those displayed in dialog 360 may comprise various other attributes as well.

After specifying one or more columns and/or key columns, dataset module 134 may define a dataset based on a data source. Dataset module may store the dataset in database 136, as an example. Dataset module 134 may also be configured to augment data and/or attributes of such a defined dataset based on data and/or functions provided by an API. Dataset module 134 may be configured to determine one or more APIs that are provided by an API gateway. To augment data with data from an on-demand data source such as this API, dataset module 134 may receive a user input that indicates an on-demand data source. Such an indication may be received for instance from data sources 302.

Based on receiving such an indication of an on-demand data source, dataset module 134 may be configured to enumerate a list of such on-demand data sources, for instance based on an index. Such an enumeration may be maintained by an API gateway, and/or by a database, such as database 136, as some examples. Based on receiving an indication of an on-demand data source, dataset module 134 may determine elements of such an indicated on-demand data source. Examples of such elements may include functions, data structures, data, and/or various other elements as well. Such elements of an on-demand data source may be searchable in a manner similar to the attributes of dialog 340.

Dataset module 134 may receive any of one or more such elements that are to be used to augment a dataset, such as a primary dataset. Based on the indicated elements of the on-demand data source, dataset module 134 may augment the dataset. For instance, if the indicated element comprises a function, dataset module 134 may apply the function to the dataset. If the indicated element comprises data (e.g., one or more values), that data may be added to the dataset. As yet another example, a function of the on-demand data source may be applied to the dataset. Such a function may change one or more values of a primary dataset if a certain condition is met, or may filter a dataset based on one or more conditions. Such a function may perform various other operations as well. In the case that such an element comprises data, such data may be appended or joined (e.g., relationally joined) with the dataset, as just some examples. Dataset module 134 may augment a dataset based on elements from one or more on-demand data sources in various other manners as well.

Dataset module 134 may be further configured to receive an indication, for example based on user input, of a second data source. Such a second data source may be indicated in a fashion similar to that described above with the first data source (e.g., batch data source 146) described above in connection with FIG. 3A. In some examples, the indicated data source may have a different cadence than the first data source. For instance, the first data source may be a batch data source, and the second data source may be a real-time data source, such as Kafka stream. Such real-time data sources may be updated with a higher frequency than batch data sources.

Based on receiving an indication of such a real-time data source, dataset module 134 may determine a snapshot of data from the real-time data source. Dataset module 134 may determine such a snapshot based on metadata associated with the data source. Such metadata may be stored in database 136, as one example. In some examples, dataset module 134 may infer metadata for such a data source. Dataset module 134 may additionally or alternatively determine metadata for such a data source by obtaining such metadata from a metadata repository that stores such metadata. Based on such metadata, dataset module 134 may ingest a snapshot of data from such a real-time data source. Ingesting data from a real-time data source may involve dataset 134 determining a well-defined schema for such a real-time data source based on metadata associated with the data source. Such a schema may define attribute data similar to that described above in connection with FIGS. 3B and 3C. Examples of such attribute data may include: one or more columns, data types, field lengths, descriptions, a table name, and/or whether a column is a key column, as some non-limiting examples. Such attribute data may take various other forms as well.

Based on such attribute data, dataset module 134 may cause a database, such as database 136, to represent the snapshot of data from the real-time data source as a table of database 136. Such a database table may comprise one or more columns and one or more rows, according to some examples. Based on metadata associated with the data source and/or the database representation of the snapshot, dataset module 134 may determine attributes of the indicated second data source. Such attributes may be output and/or displayed in a dialog similar to dialog 340 that is described above in the context of FIG. 3B. Such attributes may be determined based on an index or enumeration that may be stored in a database, such as database 136, as an example.

Dataset module 134 (e.g., dataset module 134 executing on server system 130) may receive an indication of one or more attributes of the second data source. For example, such attributes may be indicated based on receiving a user input or based on a programmatic input, and/or in various other manners. Based on the indicated attributes of the second data source, dataset module 134 may define a second dataset. According to some examples, dataset module 134 may receive an indication of a key column. Such a key column may be a column of the indicated attributes. For example, a key column may be one of a plurality of columns selected by a user. Such a primary key of a second dataset may be selected in a process similar to that described in connection with FIG. 3B.

Based on selecting attributes for a second dataset, dataset module 134 may cause a database, such as database 136 to generate a table of data from the second data source based on the indicated attributes. Such a table of data may be represented in a standardized format, such as a standardized database table format, JSON format, delimited format, etc. Dataset module 134 may represent such data in a database table based on metadata associated with the data source. For instance, dataset module 134 may determine data types for one or more columns of the table based on metadata associated metadata for each column, which may indicate such data types. Creating such a database table from the second data source may define a second dataset.

Dataset module 134 may generate a namespace based on one or more datasets, such as the first dataset and the second dataset described above. A GUI for generating such a namespace is illustrated in FIG. 3D. FIG. 3D shows an example namespace creation dialog 380. At a high level, dialog 380 may comprise fields, which may specify attributes associated with a namespace that may be formed by performing an operation, such as a relational join, on one or more datasets.

Dialog 380 may comprise a name field 382, which may define a name for the namespace. In the example of FIG. 3D, name field 382 has the value "LeadReminder," the name of a namespace to be formed. Dialog 380 may also include a namespace description field 384. Namespace description field 384 may comprise a textual description of the namespace, "Provides unified data attributes needed for initiating the lead reminders" in the example of FIG. 3D.

Dialog 380 may further comprise a primary dataset field 386, which may specify a primary dataset that is to be joined. In the example of FIG. 3D, the primary dataset of field 386 is set to "lead_information," which may comprise a global database of leads for sending the marketing communication, as an example. One or more attributes from the primary database may be specified in dialog 388. Such attributes may be selected as described in connection with FIG. 3B, or may be specified in attributes dialog 388 itself. Dialog 380 may also comprise a field 390 that may indicate a key column (e.g., a primary database key column) that may form a basis for relationally joining the first dataset with another dataset. In the example of FIG. 3D, the key column is named "lead_identifier," which may correspond to a customer identifier according to some examples.

Dialog 380 may also comprise one or more elements that specify a dataset to relationally join with the first dataset. For instance, dialog 380 may comprise a "join with" dialog 392, which may be used to specify a second dataset, "lead_status," in the example of FIG. 3D, to join with the first, "lead_information" dataset. Such a "lead_status" dataset may comprise a dataset related to sales leads' responses to prior communications, and the leads' eligibility for receiving reminder notifications (e.g., from a sales representative). Dialog 380 may also comprise a join type dialog 394. Join type dialog 394 may indicate a type of relational join to perform when joining the first dataset to the second dataset. Examples of such a join may comprise: a left join, intersection join, a left exception join, right join, full outer join, and/or any other type of relational join. In the example of FIG. 3D, the join type indicated by dialog 394 is specified as left join. The key column indicated by field 390 may be joined against the first dataset based on a key column of a second dataset, which may be indicated in key column dialog 396. In the example of FIG. 3D, the second dataset key column indicated by dialog 396 may be a column named "lead_identifier," which may correspond to a customer identifier according to some examples.

Similar to dialog 388, dialog 397 may indicate one or more attributes (such as columns) of the second dataset that are to be joined with the first dataset to form the indicated namespace. In the example of FIG. 3D, the attributes of the "lead_status" data source that are to be joined include attributes named "match_score" and "reminder_eligible." Based on the datasets, key columns, and join type specified in dialog 380, dataset module 134 may generate namespace preview 398. According to some examples, namespace preview 398 may indicate a structure of the namespace to be formed by joining the two datasets. In the example of FIG. 3D, namespace preview 398 comprises a SQL statement that indicates the names of the attributes of each dataset that are to be joined, the type of join, and key columns. Additionally or alternatively, namespace preview 398 may comprise a graphical representation of the namespace to be formed. For instance, namespace preview 398 may generate a sample table of data that may be included as part of generating the name space indicated by the parameters specified in dialog 380. Namespace preview 398 may take various other forms as well.

If sufficient parameters have been specified for generating a namespace, dataset module 134 may receive a user input that requests creation of the indicated namespace. Based on the parameters indicated in dialog 380, dataset module 134 may generate the specified dataset, for example by causing database 136 to execute a SQL query, such as the query indicated in namespace preview 398. In the example of FIG. 3D, joining the indicated attributes of the "lead_information" with the "lead_status" dataset may result in a namespace that includes rows from both data sources. Thus, the namespace may comprise attributes related to leads, in addition to reminder eligibility information for potential customers. Such a namespace may be defined even if two datasets have different cadences.

Figure 4:
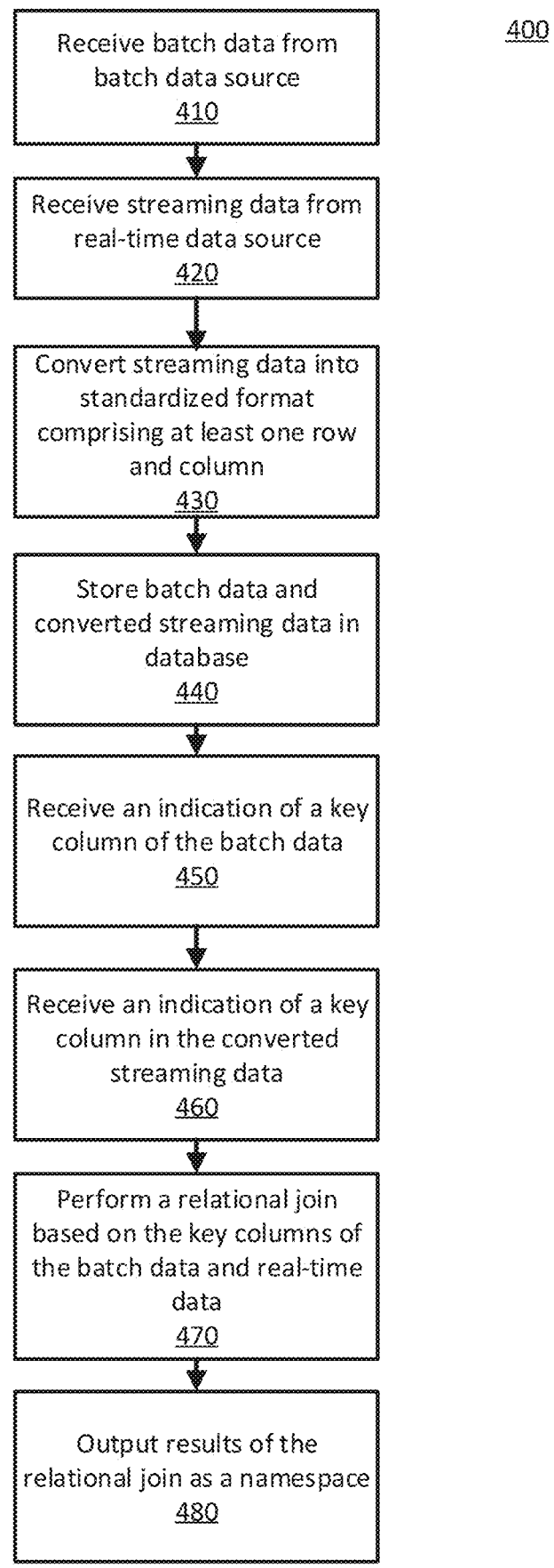
FIG. 4 shows an example flow chart of a process for generating and joining datasets in accordance with one or more aspects described herein.

As described above, a server system (e.g., server system 130) may be used to generate and join datasets based on data sources having different cadences. FIG. 4 shows a flow chart of a process for generating and joining such datasets. Some or all of the steps of process 400 may be performed using one or more computing devices as described herein. In a variety of embodiments, some or all of the steps described below may be combined and/or divided into sub-steps as appropriate.

At step 410, a computing device (e.g., dataset module 134 executing on server system 130) may receive batch data from a batch data source. In some examples, such batch data may be received from another computing device, such as one of client devices 110 or 120. Such a batch data source may comprise a data source such as a database, block data source, object-based data source, data warehouse, batch job, and/or may various other forms as well. In still further examples, the computing device may receive such batch data based on executing a query, such as a SQL query, JSON query, or another form of query. The computing device may store such batch data in a database table in some cases.

At step 420, the computing device may receive streaming data from a real-time data source. Examples of such a streaming data source may include an Apache Kafka stream, as one non-limiting example. However, any form of publish/subscribe ("pub/sub") architecture may comprise such a real-time data source. Receiving such streaming data may be based on a cadence of such a real-time data source and/or metadata for such a data source. For instance, the computing device may be configured to determine a cadence and metadata for the real-time data source and receive data in accordance with the determined cadence and metadata. According to some examples, such batch data sources and real-time data sources may be specified programmatically and/or based on user input. For instance, the computing device may receive one or more user inputs indicating the batch and/or real-time data source. Such user inputs may be received in accordance with the examples described in connection with FIGS. 3A-3D, as just some non-limiting examples.

At step 430, the computing device may convert (e.g., transform) the streaming data into a standardized format (e.g., a standardized database format, JSON format, delimited format, etc.) comprising at least one row and at least one column. The computing device may convert the streaming data into such a standardized format based on metadata in some cases. Such metadata may indicate one or more data types, column names, and/or various other parameters for the converted representation of the streaming data.

At step 440, the computing device may store the batch data and the converted (e.g., standardized) streaming data in a database. As an example, dataset module 134 may cause the received streaming data to be ingested by a database, such as database 136. Database 136 may comprise an in-memory database, such as SingleStore/MemSQL according to some examples. Such a standardized row and column-based format may comprise a table of such a database. In some cases, dataset module 134 may determine an on-demand data source, for example, based on received user input. Based on determining such an on-demand data source, the computing device may augment data from the batch data source and/or real-time data source. As some examples, the computing device may apply a function from the on-demand data source and/or may add data received from the on-demand data source to the data received from the batch and/or real-time data sources.

At step 450, the computing device may receive an indication of a key column of the batch data. Such a key column may comprise a column of the batch data. The key column may form a basis for relationally joining the batch data source with another dataset, such as a dataset of the real-time data source. Such a key column may be received by the computing device based on user input, and/or programmatically according to some examples.

At step 460, the computing device may receive an indication of a key column of the converted streaming data. The computing device may receive indications of key columns of the batch data and streaming data based on user input in accordance with some examples. For instance, the computing device (e.g., dataset module 134 executing on server system 130) may receive a user input indicating a particular column as a key column, as described in connection with FIGS. 3B and/or 3D.

At step 470, the computing device (e.g., dataset module 134 executing on server system 130) may perform a relational join of one or more rows of the batch data against one or more rows of the real-time data that has been converted to a standardized row and column format. Such a relational join may be based on the key columns of the batch data and converted, standardized streaming data. For instance, the batch data and converted, standardized streaming data may be joined where the key columns have a same value, as just one example. Such relational joins may be specified as described in connection with FIG. 3D as just one example. Such relational joins may include but may not be limited to: left joins, outer joins, right joins, left exception joins, and/or intersection joins, as just some examples. In order to perform the join, dataset module 134 may generate a query, such as a SQL query that specifies the indicated join, key columns and/or columns of the streaming and batch datasets. Dataset module 134 may cause a database such as database 136 to execute the query, which may result in the database performing the join.

At step 480, the computing device may output the results of the relational join as a namespace. Such a namespace may comprise a logical view of data that has been joined from the batch and streaming data. According to some examples, such a namespace may be assigned a name, and/or descriptive information, as described in connection with FIG. 3D, as just one example. Such a namespace may also be represented in a standardized format, such as a database table format. In some instances, outputting the namespace result of such a relational join may comprise outputting data from the namespace for display. Additionally or alternatively, the namespace may be output to storage, and/or to another computing device. Such a namespace may be output in various other manners as well. Based on a cadence of the batch and/or real-time data sources, the computing device may update the namespace. For instance, if the real-time data source has an update cadence of once per minute, the computing device may add data to the namespace or replace data in the namespace. The computing device may be configured to modify a namespace based on one or more data source cadences in various other manners as well.

Figure 5:
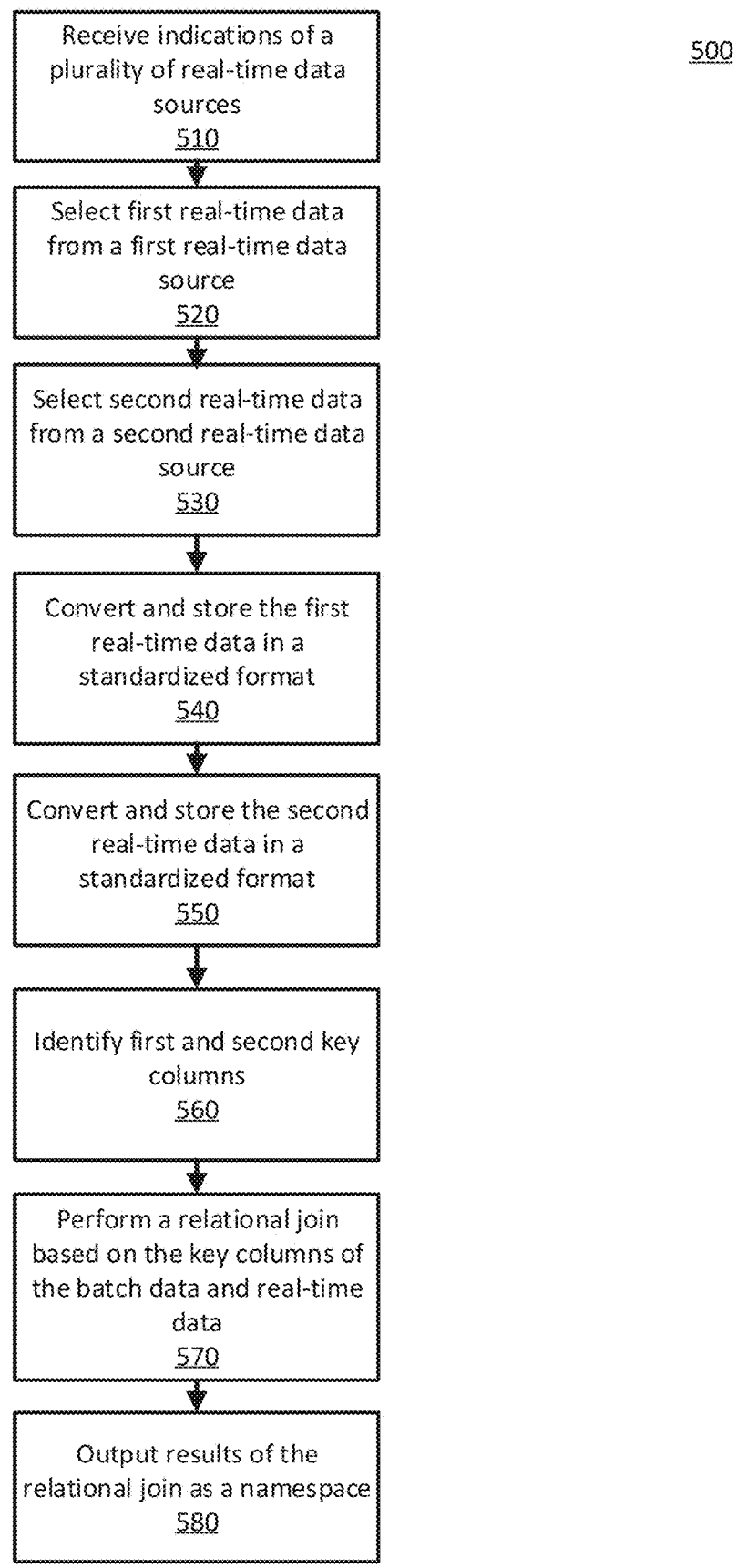
FIG. 5 shows an example flow chart of a process for generating and joining datasets, such as real-time datasets, in accordance with one or more aspects described herein.

As described above, a computing device (e.g., server system 130) may be used to generate and join datasets based on data sources having different cadences. FIG. 5 shows a flow chart of a process for generating and joining datasets, such as real-time datasets. Some or all of the steps of process 500 may be performed using one or more computing devices as described herein. In a variety of embodiments, some or all of the steps described below may be combined and/or divided into sub-steps as appropriate.

At step 510, a computing device (e.g., dataset module 134 executing on server system 130) may receive indications of a plurality of real-time data sources. In some examples, an indication of such real-time data sources may be received from another computing device, such as one of client devices 110 or 120. Examples of such a streaming data source may include an Apache Kafka stream, as one non-limiting example. Any form of pub/sub architecture may comprise such a real-time data source as well. The computing device may receive indications of such real-time data sources in accordance with the example described in connection with FIGS. 3A-3D according to some examples. According to various examples, the computing device may determine the plurality of real-time databases based on data obtained from a database such as database 136.

At step 520, the computing device may select first real-time data of a first real-time data source of the plurality of real-time data sources. The first real-time data may comprise streaming data from a streaming data source, as just one possible example. At step 530, the computing device may select second real-time data from a second real-time data source of the plurality of real-time data sources. Such first and second real-time data may be selected based on respective first and second user inputs according to some examples. For instance, the computing device may receive user inputs indicating first and second real-time data sources. Based on the indicated first and second real-time data sources, the computing device may determine one or more first attributes of the first real-time data source, and one or more attributes of the second real-time data source. Such attributes may comprise one or more columns of the first and second real-time data sources, according to some examples. The computing device may determine such attributes based on metadata associated with the first and second real-time data sources according to some examples. Such attributes may be indicated in accordance with the examples of FIGS. 3A-3D, and/or in various other manners as well.

At step 540, the computing device may convert the first real-time data to a format, such as a standardized format. According to some examples, such a format may comprise at least one row and at least one column. Examples of such standardized formats may include, but may not be limited to: a standardized database format, delimited flat file (e.g., comma separated value), JSON format, object relational mapping (ORM), etc. To convert the first real-time data into such a standardized row and column format, the computing device may cause a database, such as database 136, to execute a database query that may cause the database to ingest the first real-time data from the real-time data source and represent the ingested data as a first table (e.g., a first database table). Additionally or alternatively, the computing device may execute a transformation function to transform data from the real-time format to the row and column-based format. The computing device may store the first real-time data in the database.

According to some examples, the first real-time data may optionally be augmented. For instance, the computing device may determine an on-demand data source with which to augment the converted first real-time data. Such on-demand may comprise functions, data structures, and/or data from an API according to some examples. Such an API may be provided by an API gateway in some instances. The API gateway may provide authentication and/or authorization, according to some examples. To augment data, such as real-time data, the computing device may be configured to introspect various definitions of the on-demand data source, according to some examples. According to some examples, the computing device may be configured to determine attributes of the on-demand data source based on metadata associated with the on-demand data source. Such metadata may be stored in a database according to various examples.

At step 550, the computing device may convert the second real-time data into a format, such as a standardized format. Such a format may be a standardized row and column-based format as described above in connection with step 540. The computing device may cause the converted second real-time data to be stored in a second table (e.g., database table, etc.). Such a conversion process may be similar to that described above in connection with step 540.

At step 560, the computing device may identify first and second key columns. The first key column may be a column of the first database table, and the second key column may be a column of the second database table. The first and second key columns may be identified based on respective first and second user inputs, which may indicate the first and second key columns, respectively. The computing device may receive such user inputs in a manner similar to the examples described in connection with FIGS. 3A-3D. The first and second key columns may be identified programmatically and/or in various other manners as well.

At step 570, and based on the identified first and second key columns, the computing device may perform a relational join of one or more rows of the first database table against one or more rows of the second database table. When a computing device performs such a join, one database table, referred to as a "left table," may be relationally joined against another table, which may be referred to as a "right table." The left table may comprise the table that appears on the left side of a JOIN operator in a SQL statement, and the right table may be the table that appears on the right side of the JOIN operator as one example. Such a relational join may take forms, such as a left join, full outer join, union, intersection, and/or a left exception join, as some examples. To perform a left join, a computing device (e.g., database 136 executing on server system 130) may be configured to return all records (e.g., cells) from a left table that match records from a right database table. A full outer join may return all records from two database tables where there is a match of values from two key columns. An exception join or left exception join may return rows from a left database table query that are not included in a right database table query. An intersection, intersection join, or inner join may return only rows from the key columns that are common to both database tables. A union may return all rows from both database tables. Such joins may take various other forms as well.

At step 580, the computing device may output the results of the relational join as a namespace, for instance a namespace as described above in connection with FIG. 3D. The computing device may assign a name and/or description to such a namespace so that the namespace can be quickly referenced. Such a namespace may be saved for faster retrieval according to some examples. In some examples, such a namespace may be updated based on a cadence associated with the first data source and/or the second data source. For instance, if the first real-time data source has an update cadence of once per 30 minutes, the computing device may update the namespace once per 30 minutes (e.g., at the update cadence). The computing device may update such a namespace, for instance by re-executing the relational join query based on updated data received from the first and/or second real-time data sources. In some examples, the computing device may output the namespace for display. Such output for display may cause a display device to display data and/or structure of the namespace. The computing device may perform various other operations on such a namespace as well.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, may be written in a markup language such as (but not limited to) HTML, or XML, and/or in one or more scripting languages, such as JavaScript, TypeScript, Python, Ruby, Perl, and/or PHP. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method, comprising:
receiving streaming data from a real-time data source and batch data from a batch data source, wherein the batch data is structured as batch data rows and batch data columns;
converting the streaming data into a format comprising streaming data rows and streaming data columns;
storing, in a database, the batch data and the converted streaming data;
generating, based on the stored batch data, a first user interface and a second user interface, wherein the first user interface comprises a first selectable list of the batch data columns and a first region for designating a first key column of the batch data columns, and wherein the second user interface comprises a second selectable list of the converted streaming data columns and a second region for designating a second key column of the converted streaming data columns;
receiving, based on a first user interaction with the first user interface, a selected first key column of the batch data columns and a first namespace selection, wherein the first namespace selection comprises a first selection of less than all of the batch data columns;
receiving, based on a second user interaction with the second user interface, a selected second key column of the streaming data columns and a second namespace selection, wherein the second namespace selection comprises a second selection of less than all of the streaming data columns;
generating, based on the first namespace selection and the second namespace selection, a third user interface comprising a combined namespace of the first namespace selection and the second namespace selection;
performing, based on a third user interaction with the third user interface, a relational join, based on the selected first key column and the selected second key column, of the batch data rows in the first namespace selection of the batch data columns against the converted streaming data rows in the second namespace selection of the converted streaming data columns; and
outputting, based on performing the relational join, results of the relational join.

2. The computer-implemented method of claim 1, further comprising:
receiving on-demand data from an on-demand data source; and
modifying the converted streaming data based on the on-demand data, wherein storing the converted streaming data in the database comprises storing the modified converted streaming data in the database.

3. The computer-implemented method of claim 2, wherein the on-demand data comprises application programming interface (API) data from an API data source.

4. The computer-implemented method of claim 1, further comprising:
determining metadata for the real-time data source, wherein converting the streaming data into the format comprising streaming data rows and streaming data columns is based on the metadata.

5. The computer-implemented method of claim 1, wherein:
receiving the batch data from the batch data source is based on a user input selection of the batch data source, and
receiving the streaming data from the real-time data source is based on a user input selection of the real-time data source.

6. The computer-implemented method of claim 1, further comprising:
determining a cadence of the real-time data source, wherein the cadence indicates a frequency at which the real-time data source is updated; and
based on the cadence:
receiving additional streaming data from the real-time data source; and
updating the combined namespace based on the received additional streaming data.

7. The computer-implemented method of claim 1, further comprising:
causing output, for display, of preview data from the real-time data source,
wherein the preview data comprises one or more of:
at least one column name of the batch data columns; or
at least one attribute of at least one column of the real-time data source.

8. A computing device comprising:
one or more processors; and
memory storing instructions that, when executed by the one or more processors, cause the computing device to:
receive indications of a plurality of real-time data sources;
select, based on a first user input, first real-time data of a first real-time data source of the plurality of real-time data sources;
select, based on a second user input, second real-time data from a second real-time data source of the plurality of real-time data sources;
convert the first real-time data into a format comprising first streaming data rows and first streaming data columns;
store the converted first real-time data in a first database table;
convert the second real-time data into a format comprising second streaming data rows and second streaming data columns;

store the second converted real-time data in a second database table;

generate, based on the first database table, a first user interface and, based on the second database table, a second user interface, wherein the first user interface comprises a first selectable list of the first streaming data columns and a first region for designating a first key column of the first streaming data columns, and wherein the second user interface comprises a second selectable list of the second streaming data columns and a second region for designating a second key column of the second streaming data columns;

receive, based on a first user interaction with the first user interface, a selected first key column and a first namespace selection, wherein the first namespace selection comprises a first selection of less than all of the first streaming data columns;

receive, based on a second user interaction with the second user interface, a selected second key column and a second namespace selection, wherein the second namespace selection comprises a second selection of less than all of the second streaming data columns;

generate, based on the first namespace selection and the second namespace selection, a third user interface comprising a combined namespace of the first namespace selection and the second namespace selection;

perform, based on a third user interaction with the third user interface, a relational join, based on the selected first key column and the selected second key column, of the first streaming data rows in the first namespace selection of the first streaming data columns against the second streaming data rows in the second namespace selection of the second streaming data columns; and output, based on relational join, results of the relational join.

9. The computing device of claim 8, wherein the instructions, when executed by the one or more processors, further cause the computing device to:

receive on-demand data from an on-demand data source; and modify the converted first real-time data based on the on-demand data, wherein storing the converted first real-time data comprises storing the modified first real-time data in the first database table.

10. The computing device of claim 8, wherein the instructions, when executed by the one or more processors, further cause the computing device to:

output, for display, preview data from the first real-time data source, wherein the preview data comprises at least one column name that corresponds to at least one column of the first real-time data source.

11. The computing device of claim 8, wherein the instructions, when executed by the one or more processors, further cause the computing device to:

determine first metadata for the first real-time data source and second metadata for the second real-time data source, wherein:

converting the first real-time data is based on the first metadata; and converting the second real-time data is based on the second metadata.

12. The computing device of claim 11, wherein the first metadata comprises one or more of:
connection information for the first real-time data source;
a cadence of the first real-time data source; or
attributes of the first real-time data; and wherein the second metadata comprises:
connection information for the second real-time data source;
a cadence of the second real-time data source; or
attributes of the second real-time data.

13. The computing device of claim 8, wherein the relational join comprises at least one of:
a left join;
an inner join; or
a left exception join.

14. The computing device of claim 8, wherein the instructions, when executed by the one or more processors, further cause the computing device to:

determine a cadence for the second real-time data source wherein the cadence indicates a frequency at which the second real-time data source is updated; and based on the cadence:
receive additional real-time data from the second real-time data source; and
update the combined namespace based on the additional real-time data received from the second real-time data source.

15. A non-transitory computer-readable medium comprising instructions, that when executed by one or more processors, cause a computing device to perform steps comprising:

receiving a corresponding user selection for each of:
a batch data source from a plurality of batch data sources, with batch data structured as batch data rows and batch data columns;
first columns of the batch data columns, wherein a first quantity of the first columns is fewer than all of the batch data columns;
a first key column of the batch data source;
a real-time data source selected from a plurality of real-time data sources; and
a second key column of real-time data from the selected the real-time data source;
second columns of the real-time data, wherein a second quantity of the second columns is fewer than all of the real-time data columns;

receiving, based on the selection of the batch data source, batch data from the batch data source;

receiving, based on the selection of the real-time data source, a snapshot of additional real-time data from the real-time data source;

converting the snapshot of the additional real-time data into a format comprising rows and columns;

storing, in a first database table, the batch data, from the selected first columns;

storing, in a second database table, the converted snapshot of the additional real-time data, wherein the stored converted snapshot comprises the additional real-time data associated with the selected second columns;

generating, as a first user interface comprising a combined namespace, a list of names of the first columns and the second columns;

receiving, based on a second user interaction with the first user interface, an indication of a type of relational join to perform on the first database table and the second database table;

performing, based on the received indication, the indicated type of relational join, based on the first key column and the second key column, on the first database table and the second database table; and outputting results of the relational join.

16. The non-transitory computer-readable medium of claim 15, wherein the instructions, when executed by the one or more processors, cause the computing device to perform further steps comprising:

determining a cadence for the real-time data source wherein the cadence indicates a frequency at which the real-time data source is updated; and based on the cadence:
receiving additional real-time data from the real-time data source; and
updating the combined namespace based on the additional real-time data received from the real-time data source.

17. The non-transitory computer-readable medium of claim 15, wherein the instructions, when executed by the one or more processors, cause the computing device to perform further steps comprising:

determining metadata for the batch data source,
wherein storing the batch data in the first database table is based on the metadata.

18. The non-transitory computer-readable medium of claim 15, wherein the instructions, when executed by the one or more processors, cause the computing device to perform further steps comprising:

receiving application programming interface (API) data from an API gateway; and modifying the received batch data based on the API data, wherein storing the batch data in the first database table comprises storing modified batch data in the first database table.

19. The non-transitory computer-readable medium of claim 15, wherein the relational join comprises one or more of:

a left join;
an inner join; or
a left exception join.

20. The non-transitory computer-readable medium of claim 15, wherein the received batch data comprises one of:
database data, and wherein the batch data source comprises a database;
object data, and wherein the batch data source comprises an object data source;
block data, and wherein the batch data source comprises a block data source; or
file data, and wherein the batch data source comprises a file storage data source.

* * * * *